Feb. 27, 1951

I. SWIDLER 2,543,076

MICROMETER SETTING DEVICE

Filed Feb. 4, 1946

INVENTOR.
ISIDORE SWIDLER

BY M. C. Hayes

ATTORNEY

Patented Feb. 27, 1951

2,543,076

UNITED STATES PATENT OFFICE 2,543,076

MICROMETER SETTING DEVICE

Isidore Swidler, Philadelphia, Pa.

Application February 4, 1946, Serial No. 645,422

1 Claim. (Cl. 33—167)

(Granted under the act of March 3, 1883, as amended April 30, 1928; 370 O. G. 757)

This invention relates to a micrometer-setting device and more specifically to an attachment for accurately setting the adjustable anvil of an arch micrometer.

An object of this invention is to provide an attachment for aiding in accurately setting the adjustable anvil of an arch micrometer with respect to the spindle.

A further object is to provide an attachment adapted to clamp on the outer end of an arch micrometer and impart a finely-controlled movement to the adjustable anvil for accurate adjustment relative to the zero setting of the spindle thimble adjustment.

A further object is to provide a device that facilitates the use of an arch micrometer to accommodate different sizes of work by accurately setting the gap between the adjustable anvil and the zero setting of the movable spindle, the micrometer readings being limited to one or two inches while the span of the arch or frame can be four to twelve inches or more.

Further objects and advantages of this invention, as well as its construction, arrangement and operation are apparent from the following description and claim in connection with the accompanying drawings, in which:

Figure 1:
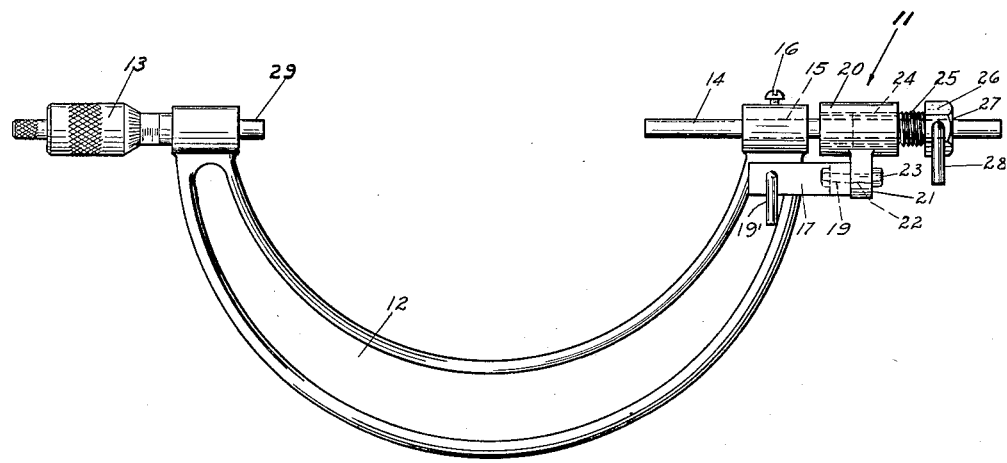
Fig. 1 is a front elevational view of a preferred embodiment of the present invention.
Figure 2:
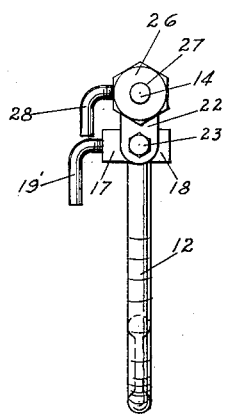
Fig. 2 is an end elevational view of the device shown in Fig. 1.

A preferred form of the micrometer setting device 11 is shown attached to an arch micrometer 12 having a thimble 13 at one end and an adjustable anvil 14 at the other end.

The adjustable anvil 14 is slidably mounted in a bore 15 in one end of the frame 12 and is secured in a selected position by the setscrew 16. The setting device is clamped to one end of the frame 12 by means of a U-shaped clamp having furcated arms 17 and 18, and a threaded clamping handle 19' on the arm 17. Between arms 17 and 18 is a crosspiece having a bore 19 to which is rotatably connected a cylindrical member 20 having a depending ear 21 with a bore 22. A nut and bolt assembly 23 pass thru the bores 19 and 22 thus rotatably connecting the furcated clamp and the cylindrical member 20.

The cylindrical member 20 has internal threads 24 engaged by the threaded bushing 25. The threaded bushing 25 has a hexagonal head 26 at the outer end and a bore 27 adapted to receive for sliding the adjustable anvil 14. A threaded clamp handle 28 clamps the anvil 14 in position within the bushing 25.

In operation, when it is desired to set the anvil 14 to accommodate any particular work such as pieces varying in size from four to five inches, the micrometer thimble 13 associated with spindle 29 is set at zero and the setting device 11 is attached to the opposite end of frame 12. With the setscrew 16 loose the anvil 14 is slid thru the bore 27 in bushing 25 until the gap between the micrometer spindle 29 and the adjustable anvil 14 is slightly more than four inches.

The clamping handle 28 is tightened and a gage measuring exactly four inches is placed between the anvil and the spindle. A wrench is used on the hexagonal head 26 to rotate and move the bushing 25 inwardly. This slowly moves the adjustable anvil 14 inwardly until the end just touches the four inch gage. When the gap is accurately set at four inches the set screw 16 is tightened and the setting device 11 is removed. The arch micrometer can now be used to make accurate measurements from four to five inches.

The setting device 11 is used in a similar manner to make any settings within the range of the particular arch micrometer to which it is attached.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

In a micrometer a frame, said frame having therethrough a cylindrical bore with an axis, a clamp, means for detachably mounting said clamp on said frame adjacent said bore, a boss mounted on said clamp for swinging movement about an axis parallel to said bore axis, said boss having a bore axially alignable with said frame bore, said boss bore being larger than said frame bore and threaded, an externally threaded bushing in the threaded boss bore for screwing movement along the bore axis, said bushing having therethrough a bore of substantially the same diameter as the frame bore and coaxial with the boss bore, a cylindrical anvil freely slidably mounted in the bushing and frame bores, screw means in said frame for releasably locking said anvil in said frame, and screw means in said bushing for releasably locking said anvil in said bushing.

ISIDORE SWIDLER.

REFERENCES CITED

The following references are of record in the file of this patent:

UNITED STATES PATENTS

| Number | Name | Date |
|---|---|---|
| 368,554 | Spaulding | Aug. 16, 1887 |
| 438,738 | Tansley | Oct. 21, 1890 |
| 1,254,218 | Eskelinen | Jan. 22, 1918 |
| 1,291,211 | Slocomb | Jan. 14, 1919 |
| 1,425,201 | Hetherington | Aug. 8, 1922 |
| 1,475,066 | Gregory | Nov. 20, 1923 |